US012619911B2

(12) United States Patent (10) Patent No.: US 12,619,911 B2
Marinescu et al. (45) Date of Patent: May 5, 2026

(54) COMPUTING ROBUST POLICIES IN OFFLINE REINFORCEMENT LEARNING

(71) Applicant: INTERNATIONAL BUSINESS MACHINES CORPORATION, Armonk, NY (US)

(72) Inventors: Radu Marinescu, Dublin (IE); Parikshit Ram, Atlanta, GA (US); Djallel Bouneffouf, Poughkeepsie, NY (US); Tejaswini Pedapati, White Plains, NY (US); Paulito Palmes, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 17/807,397

(22) Filed: Jun. 17, 2022

(65) Prior Publication Data

US 2023/0409957 A1 Dec. 21, 2023

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| | | | |
|---|---|---|---|
| 10,445,653 | B1 | 10/2019 | Veness |
| 2019/0236458 | A1 | 8/2019 | Taylor |
| 2021/0398061 | A1 | 12/2021 | Acuna Agost |

FOREIGN PATENT DOCUMENTS

WO 2020254400 A1 12/2020

OTHER PUBLICATIONS

Moos, Janosch, Kay Hansel, Hany Abdulsamad, Svenja Stark, Debora Clever, and Jan Peters. "Robust reinforcement learning: A review of foundations and recent advances." Machine Learning and Knowledge Extraction 4, No. 1 (2022): 276-315.) (Year: 2022).*
Mishra A, Soni U, Huang J, Bryan C. Why? why not? when? visual explanations of agent behavior in reinforcement learning. arXiv preprint arXiv:2104.02818. Apr. 6, 2021. (Year: 2021).*
Achiam J, Held D, Tamar A, Abbeel P. Constrained policy optimization. InInternational conference on machine learning Jul. 17, 2017 (pp. 22-31). PMLR. (Year: 2017).*
Jiang, et al., "Doubly Robust Off-policy Value Evaluation for Reinforcement Learning," Proceedings of The 33rd International Conference on Machine Learning, 2016, 10 pages, vol. 48, Retrieved from the Internet: <URL: http://proceedings.mlr.press/v48/jiang16.html>.
Mell, et al., "The NIST Definition of Cloud Computing", National Institute of Standards and Technology, Special Publication 800-145, Sep. 2011, 7 pages.

(Continued)

*Primary Examiner* — Vincent Gonzales
(74) *Attorney, Agent, or Firm* — Robert D. Bean

(57) ABSTRACT
According to one embodiment, a method, computer system, and computer program product for reinforcement learning is provided. The present invention may include training, using an offline dataset, a plurality of diverse reward models, and creating a policy based on an output of the reward models and a robustness operator of the reward models.

20 Claims, 6 Drawing Sheets

200

(56) References Cited

OTHER PUBLICATIONS

Rauber, et al., "Hindsight Policy Gradients," ICLR 2019 [conference paper], Feb. 20, 2019, 38 pages, Retrieved from the Internet: <URL: https://arxiv.org/abs/1711.06006v3>.

Sonar, et al. "Invariant Policy Optimization: Towards Stronger Generalization in Reinforcement Learning," Nov. 9, 20210 16 pages, arXiv:2006.01096v3, Retrieved from the Internet: <URL: https://arxiv.org/abs/2006.01096>.

Yang, et al., "A Generalized Algorithm for Multi-Objective Reinforcement Learning and Policy Adaptation," 33rd Conference on Neural Information Processing Systems (NeurIPS 2019), [accessed on Apr. 14, 2022], 12 pages, Retrieved from the Internet: <URL: https://proceedings.neurips.cc/paper/2019/hash/4a46fbfca3f1465a27b210f4bdfe6ab3-Abstract.html>.

* cited by examiner

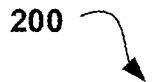

200

```
                    ┌─────────────┐
                    │    START    │
                    └──────┬──────┘
                           │
                           ▼
        ┌──────────────────────────────────────┐
        │   Receive an offline dataset. 202     │
        └──────────────────┬───────────────────┘
                           │
                           ▼
        ┌──────────────────────────────────────┐
        │ Train a plurality of diverse reward   │
        │ models on the offline dataset. 204    │
        └──────────────────┬───────────────────┘
                           │
                           ▼
        ┌──────────────────────────────────────┐
    ┌──▶│ Create a policy based on an output of  │
    │   │ the reward models and a robustness    │
    │   │ operator of the reward models. 206    │
    │   └──────────────────┬───────────────────┘
    │                      │
    │                      ▼
    │   ┌──────────────────────────────────────┐
    │   │ Visualize behavior of the policy to   │
    │   │ a user. 208                           │
    │   └──────────────────┬───────────────────┘
    │                      │
    │                      ▼
┌───────────────────┐   ◇ User
│ Change hyper-     │NO determines policy ◇
│ parameters of the │◀── to be robust?
│ reward models.    │     210
│ 212               │      │
└───────────────────┘      │ YES
                           ▼
                    ┌─────────────┐
                    │     END     │
                    └─────────────┘
```

FIG. 2

COMPUTING ROBUST POLICIES IN OFFLINE REINFORCEMENT LEARNING

BACKGROUND

The present invention relates, generally, to the field of computing, and more particularly to machine learning.

Machine learning is a technological field of inquiry concerned with creating and improving computerized systems that "learn"; that is to say, systems that leverage data to improve performance on a set of tasks. Machine learning algorithms build a model based on sample data, known as training data, to make predictions or decisions without being explicitly programmed to do so. Machine learning algorithms are used in a wide variety of applications, such as medicine, speech recognition, and computer vision, where it is difficult or unfeasible to develop conventional algorithms to perform the needed tasks.

SUMMARY

According to one embodiment, a method, computer system, and computer program product for reinforcement learning is provided. The present invention may include training, using an offline dataset, a plurality of diverse reward models; and creating a policy based on an output of the reward models and a robustness operator of the reward models.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 is an operational flowchart illustrating an offline learning process according to at least one embodiment of the present invention;

DETAILED DESCRIPTION

Figure 1:
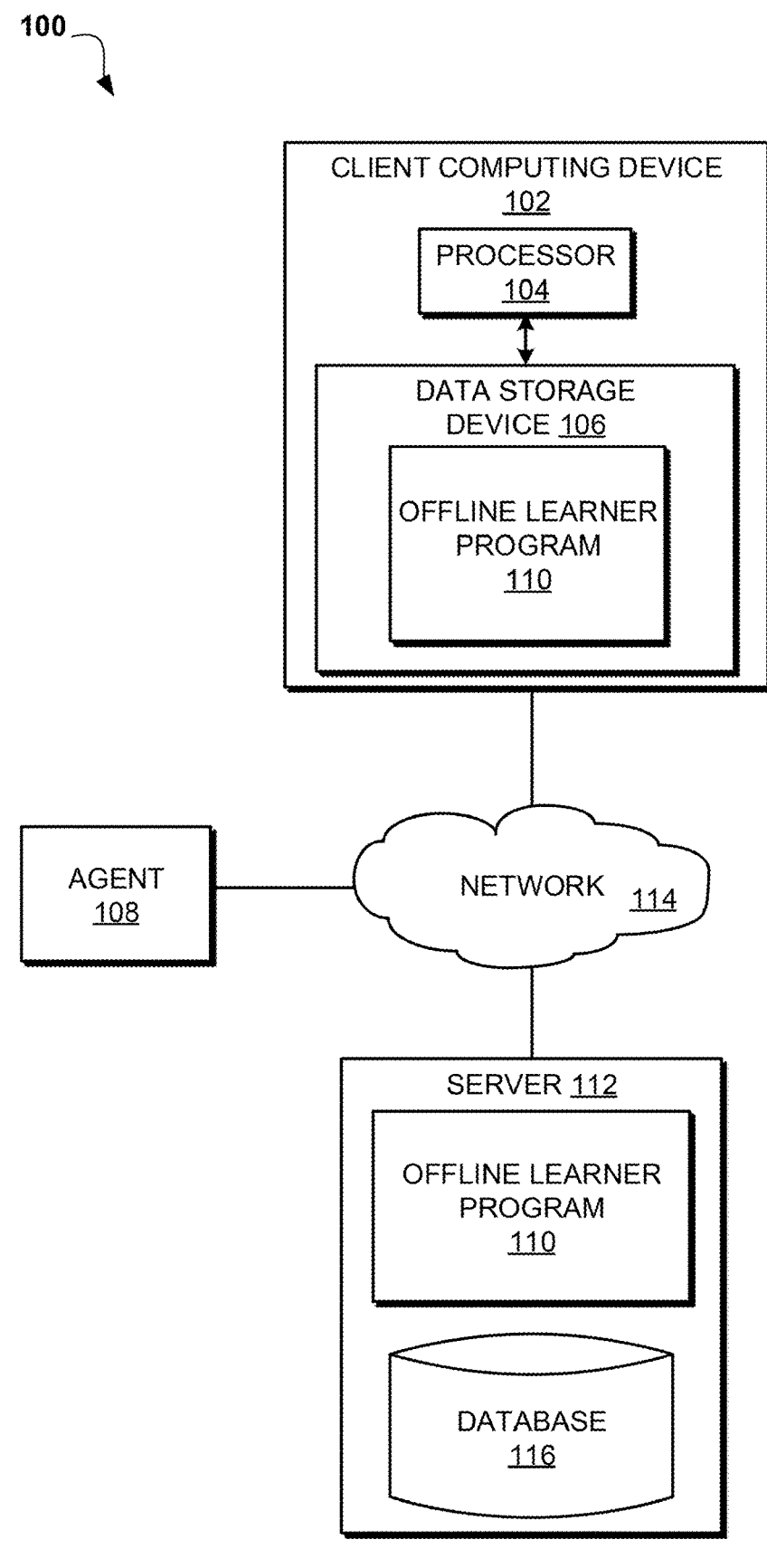
FIG. 1 illustrates an exemplary networked computer environment according to at least one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to machine learning. The following described exemplary embodiments provide a system, method, and program product to, among other things, train multiple reinforcement learning models on an offline dataset, and creating a robust policy based on the output of the machine learning models and a robustness operator. Therefore, the present embodiment has the capacity to improve the technical field of machine learning by providing an offline method of creating a policy for a training an agent through reinforcement learning that is robust even with unreliable reward signals, and which can tackle effectively any sequential decision-making problem with multiple objectives and user tradeoffs.

As previously described, machine learning is a technological field of inquiry concerned with creating and improving computerized systems that "learn"; that is to say, systems that leverage data to improve performance on a set of tasks. Machine learning algorithms build a model based on sample data, known as training data, to make predictions or decisions without being explicitly programmed to do so. Machine learning algorithms are used in a wide variety of applications, such as medicine, speech recognition, and computer vision, where it is difficult or unfeasible to develop conventional algorithms to perform the needed tasks.

Reinforcement Learning is a learning framework that handles sequential decision-making problems, wherein an 'agent' or decision maker learns a policy to optimize a long-term reward by interacting with an unknown environment. At each step, a RL agent obtains evaluative feedback, called reward or cost, about the performance of its action, allowing the agent to improve (maximize or minimize) the performance of subsequent actions. Reinforcement learning differs from supervised learning in that reinforcement learning does not need labelled input-output pairs be presented, nor does it need sub-optimal actions to be explicitly corrected. Furthermore, the use of samples to optimize performance and the use of function approximation to deal with large environments allows reinforcement learning models to be used in large environments in situations where, for example, a model of the environment is known but an analytic solution is not available, only a simulation model of the environment is given, or the only way to collect information about the environment is to interact with it. However, reinforcement learning can be suboptimal in situations where the agent might not be able to interact with the environment, or where the interaction might be very expensive. For example, where the reinforcement learning program is attempting to learn to drive a car, it may likely damage or destroy the car multiple times before it learns to make a right turn, due to the trial-and-error nature of reinforcement learning. As a result, offline reinforcement learning may be useful in critical domains/environments where the interaction between agent and environment is extremely expensive, like driving a car or delivering treatments in a healthcare environment.

However, to produce robust policies, a reinforcement learning algorithm often requires a clear reward signal, which may be a user-provided reinforcement signal that accumulates from the immediate rewards, and which the machine learning algorithm strives to maximize. However, in many real-world situations, the reward signal is not clear; for example, where the agent is learning to drive a car, the reward signal represents how well the agent drives, obeys the traffic rules, avoids vehicles and obstacles, et cetera. In another example, where the agent may be learning how to conduct dialogue, the reward signal may reflect brevity of dialogue, success, et cetera. These reward signals are subjective and difficult to define empirically and are therefore imprecise and unreliable from a mathematical standpoint. A reinforcement learning model trained with such unreliable and imprecise reward signals is likely to exhibit behavior that is likewise unreliable and imprecise with respect to its objectives when deployed in a real environment.

Furthermore, in some real-world scenarios where agents may be deployed, for example where the agent is a rover on Mars, online reinforcement methods may not be available or feasible. Online reinforcement methods may ingest and assimilate new training data over time, whereas offline reinforcement methods may rely on logged data, such as data from previous experiments or human demonstrations, upon which the reinforcement learning model is trained. Online reinforcement may not be feasible in scenarios where network connectivity and access to new data is unavailable or unreliable, where active data collection is expensive, for example in robotics, drug discovery, dialogue generation, recommendation systems, et cetera, and/or where active data collection is unsafe or dangerous, for example in healthcare, autonomous driving, or education. Offline reinforcement methods require no further environmental interaction and may function without any external connection at all.

As such, it may be advantageous to, among other things, implement a system that learns a policy from an offline dataset such that the policy is robust with respect to the reward inaccuracy even where the reward inaccuracy is high, by using a number of different machine learning models, or reward models, running in parallel to produce independent expected reward values from the same corpus of offline training data, and expressing the collective output of the reward models as a single robustness factor. The more reward models used to formulate the robustness factor, the higher the robustness. It may further be advantageous to implement a system that develops a policy based on the robustness factor which is capable of producing robust/reliable behavior when an agent trained on the policy is deployed in the real environment, where robust/reliable behavior may include, in the example where the agent is driving a car, agent driving that is well-aligned to the road and adherent to the speed limit. It may further be advantageous to implement a system which is capable of learning even where active data collection is expensive, dangerous, unavailable, et cetera by utilizing offline datasets, which may allow a system to extract policies from large and diverse training datasets.

According to one embodiment, the invention may be a method of creating a set of reward models from an offline dataset and an imprecise reward signal and uses a robustness function to learn a value function that produces a robust policy for guiding an agent.

In some embodiments of the invention, the offline dataset may be a training dataset for a reinforcement learning algorithm. The training data comprising the offline dataset may comprise static datasets of previously collected interactions of the agent; these static datasets may be formatted in accordance with the tuples (s, a, r, s'), where s represents a state of an agent at a time t, "a" represents an action that the agent chooses from a set of available actions (such as, in the case of a Mars rover, changing position and taking a photograph), s' represents a state to which the agent transitions after performing the action a, and r represents a reward associated with the transition between state s and s'. The offline dataset may comprise data from previous experiments and/or human demonstrations, and may not be updated with further environmental interaction, in real time or otherwise.

In some embodiments of the invention, the robustness operator may be a preference relation, which may be, for example, defined by a convex combination of the elements in a k-dimensional reward vector. In some embodiments of the invention, the robustness operator may be the minimum over a k-dimensional vector of reward values. In some embodiments of the invention, the robustness operator may be a tau-percentile over a k-dimensional vector of reward values.

In an exemplary embodiment of the invention, the system may be training an agent to control a rover on Mars. In this scenario, the rover must be able to drive itself and take pictures, so the action space includes actions for driving the wheels and for taking photos. The reward is assumed to be unreliable. The system may generate a set of reward models M1, . . . Mk using, for example, different regression models or neural nets with specific hyper-parameters. During policy learning (e.g., Q-learning) the invention may use the following target to update the value function: $r\_t + \gamma \max_\tau a_{[fo]}$ $[Q(s\_t, a)]$ $r\_t = r\_t \hat{} \tau = \tau$-percentile$(R\_1, \ldots, R\_k)$, where $R1, \ldots, Rk$ are the immediate rewards predicted by models $M1, \ldots, Mk$.

| State: xpos | State: ypos | Action: photo | Action: move-x | Action: move-y | Action: angle | Action: shot | Re-ward |
|---|---|---|---|---|---|---|---|
| 0.123 | 0.432 | 1 | −0.223 | −0.112 | 0.12 | 0.33 | 12.3 |
| −0.223 | −0.115 | 0 | 0.123 | 1.224 | 1.22 | 0.44 | −1.23 |
| 1.446 | 1.221 | 0 | 1.442 | −1.226 | 0.43 | 0.11 | −6.33 |
| . . . | | | | | | | |

Here, $R1, \ldots, Rk=5=(2, 3, 5, 4, 2)$ and $r\_t = r\_t\hat{}(\tau=0.3)=3.2$ generalizes the worst case.

According to at least one embodiment, the invention may take an offline dataset consisting of tuples (s, a, r, s'), and a number of reward models k as input, and may output a set of reward models M1-Mk. A may be an automated machine learning engine such as IBM® (IBM® and all IBM®-based trademarks and logos are trademarks or registered trademarks of International Business Machines, Inc. and/or its affiliates) AutoAI, or SageMaker® (Amazon SageMaker® and all Amazon SageMaker®-based trademarks and logos are trademarks or registered trademarks of Amazon Technologies, Inc. and/or its affiliates). The program may run A on the input dataset and return the top k pipelines produced by A. M1, . . . , Mk may be top k regression pipelines, or top k neural nets, or a combination of k regression pipelines and neural nets.

According to at least one embodiment, the invention may take an offline dataset D consisting of tuples (s, a, r, s'), and reward models M1, . . . , Mk, percentile $\tau$ as input, and may output a policy $\pi(a|s)$. Assuming a Q-learning framework, the policy may be derived from the action-value function, where the system only displays the value function update step. The system may repeat the following process until convergence: for each episode, sampled from D, let (s, a, s') be the current transition and let $r=(R1, \ldots, Rk)$ be the reward vector predicted by the reward models M1, . . . , Mk for the current (s, a) Let $r\_t = \tau$-percentile$(R\_1, \ldots, R\_k)$ Update the Q-values using the target: $r\_t + \gamma \max_\tau a_{[fo]} Q(s\hat{},$ a). Return deterministic policy $\pi(a|s)=\text{argmax\_a } Q(s, a)$. Alternatively, return stochastic distribution by softmax: $\pi(a|s)=\text{softmax\_a } Q(s,a)$.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to train multiple reinforcement learning models on an offline dataset, and creating a robust policy based on the output of the machine learning models and a robustness operator.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run an agent 108 and an offline learning program 110 and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402*a* and external components 404*a*, respectively.

The agent 108 may be a software program or subroutine that operates to execute the policy created by the offline learning program 110. The agent 108 may read the policy as input and convert it into the practical outputs necessary to control hardware in accordance with the policy. The agent 108 may read the policy as input and convert it into the practical outputs necessary to operate or visualize a graphical software agent that is executing the policy in a simulated environment; for example, where the policy concerns navigating a rover on the moon, the agent 108 may execute the policy within a simulated environment using a graphical model of the rover, such that the user can view and assess the success of the policy. The function of the agent 108 may vary based on the purpose and context of the offline learning program 110; for example, where the offline learning program 110 is adapted to create a policy comprising navigation instructions for an autonomous vehicle in a particular embodiment, the agent 108 may integrate with the hardware of the autonomous vehicle in order to control the autonomous vehicle and navigate it in accordance with the policy. The agent 108 may control or otherwise be connected to and/or in communication with specialized hardware, such as an autonomous vehicle, a mechanical arm, manufacturing machines, servos, cameras, et cetera.

The server computer 112 may be a laptop computer, netbook computer, personal computer (PC), a desktop computer, or any programmable electronic device or any network of programmable electronic devices capable of hosting and running an offline learning program 110 and a database

116 and communicating with the client computing device 102 via the communication network 114, in accordance with embodiments of the invention. As will be discussed with reference to FIG. 4, the server computer 112 may include internal components 402*b* and external components 404*b*, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the offline learning program 110 may be a program enabled to train multiple reinforcement learning models on an offline dataset, and creating a robust policy based on the output of the machine learning models and a robustness operator. The offline learning program 110 may be located on client computing device 102 or server 112 or on any other device located within network 114. Furthermore, offline learning program 110 may be distributed in its operation over multiple devices, such as client computing device 102 and server 112. The offline learner method is explained in further detail below with respect to FIG. 2.

Referring now to FIG. 2, an operational flowchart illustrating an offline learner process 200 is depicted according to at least one embodiment. At 202, the offline learning program 110 receives an offline dataset. The training data comprising the offline dataset may be formatted in accordance with the tuples (s, a, r, s'), where s is a state of an agent at a time t, "a" is an action that the agent chooses from a set of available actions (such as, in the case of a Mars rover, changing position and taking a photograph), s' is a state to which the agent transitions after performing the action a while in state s, and r is a reward associated with the transition between state s and s'. The offline learning program 110 may receive the offline dataset from the network 114 or any devices or services connected with network 114, such as database 116 or server 112. The offline dataset may be pre-provided by a user or web service.

At 204, the offline learning program 110 trains a plurality of reward models on the offline dataset. Here, the offline learning program 110 generates a set of reward models with specific hyper-parameters. The reward models may be machine learning models utilizing a variety of different machine learning techniques such as top-k regression models, top-k neural networks, some combination of top-k regression models and top-k neural networks, and/or any number or combination of machine learning models that are capable of predicting a reward r given a state s and an action a, to predict the rewards for different actions and state transitions performed by the agent 108 based on the offline training data. The hyper-parameters may be parameters used to control the speed and quality of the learning process of the reward models and may be tuned to affect the performance of the reward models. Hyper-parameters may include learning rate and batch size of the reward models. The reward models may output predicted immediate rewards predicted by the models in the form of a vector. The offline learning program 110 may vary the initial hyper-parameters to result in reward models that use different hyper-parameters such as different learning techniques, speed, quality, learning rate, batch size, et cetera such that each reward model is different; when the reward models differ from each other in hyper-parameter and/or machine learning techniques, they may be considered diverse. Diverse reward models provide a more complete spectrum of rewards, resulting in a policy that reflects multiple solutions to a task and is thereby more flexible and robust than non-diverse reward models, which may find only a single solution to a task where multiple solutions exist.

At 206, the offline learning program 110 creates a policy based on an output of the reward models and a robustness operator of the reward models. The robustness operator may be a function which takes as its input a vector of reward values and outputs that vector of reward values as a single number. The robustness operator may be, for example, defined by a convex combination of the elements in a k-dimensional reward vector. In some embodiments of the invention, the robustness operator may be the minimum or maximum value of the k-dimensional vector of reward values, a weighted average of the input rewards, or the tau-percentile value of the k-dimensional vector of reward values. The offline learning program 110 may utilize a policy learning technique such as Q-learning to compute, based on the expected rewards predicted by the reward models and expressed through the robustness operator, a value function by applying the Bellman equations in a supervised manner. The value function may be a function that determines how much reward an agent receives if the system is in a state s and the agent applies an action a.

The offline learning program 110 may utilize the value function to determine a maximum expected value of the total reward over any and all successive steps and/or actions performed by agent 108, starting from the current state. The rewards and sequence of actions/steps resulting in maximum expected value may be expressed as a policy; in other words, the policy may be a map of the agent's 108 action selection, which gives the probability of taking any action of the list of available actions when in a state of the list of available states based on the expected rewards, and thereby dictates a theoretically optimal behavior of the agent 108.

At 208, the offline learning program 110 visualizes the behavior of the policy to a user. Here, the offline learning program 110 may digitally simulate a real-world environment; within the simulation, the agent 108 may behave in accordance with the policy, i.e., by performing actions and transitioning between states as specified by the policy within the simulated environment and responsive to simulated stimuli. For example, offline learning program 110 may simulate a parking lot, and the agent 108 may drive a simulated car around the simulated parking lot in accordance with the policy. This simulation may be displayed to a user on a display device and expressed using graphical elements, text and/or numerals. In some embodiments, the offline learning program 110 may visualize the behavior of the policy by causing the agent 108 to execute its behaviors within a real-world environment in the presence of a user by operating hardware such as flying an unmanned aerial vehicle, a robotic arm, and/or a remote-controlled car. In watching the agent 108 execute the policy, the user may determine whether the behavior of the agent 108, and by extension the policy, is accurate enough to be considered robust.

At 210, the offline learning program 110 determines whether the user has indicated the policy to be robust. Here, the offline learning program 110 may solicit user feedback in response to the visualization, for example by sending a textual, auditory, and/or graphical prompt to a display and/or to a mobile device associated with a user. The prompt may provide fields, buttons, graphical user interface elements, et cetera which allow for the user to indicate approval or disapproval with the robustness of the policy. If the user communicates disapproval with the robustness of the policy, the offline learning program 110 may determine that the user has not indicated the policy to be robust. If the user communicates approval with the robustness of the policy, the offline learning program 110 may determine that the user has indicated the policy to be robust. According to one implementation, if the offline learning program 110 determines that the user has determined that the policy is not robust (step 210, "NO" branch), the offline learning program 110 may continue to step 212 to change the hyper-parameters of the machine learning models. If the offline learning program 110 determines that the policy is robust (step 212, "YES" branch), the offline learning program 110 may terminate.

At 212, the offline learning program 110 may change the hyper-parameters of the reward models. The hyper-parameters may be parameters used to control the speed and quality of the learning process of the reward models and may be tuned to affect the performance of the reward models. Hyper-parameters may include learning rate and batch size of the reward models. The offline learning program 110 may solicit changes to the hyper-parameters from the user, for example by sending a textual, auditory, and/or graphical prompt to a display and/or to a mobile device associated with a user, and execute the changes provided by the user to the hyper-parameters of the reward models. The offline learning program 110 may adjust the number and types of the reward models to learn. For example, if the offline learning program 110 may begin by learning k=3 reward models, for example by using AutoAI© to produce the top 3 regression pipelines. Then, as the offline learning program 110 iterates, the user may want to adjust the hyper-parameters to change k to 5 reward models, and instead of regression use density estimation with underlying gauss distributions. Later, the user may want to change the gauss distribution to something else, such as a histogram or a sum-product Network model and may change the hyper-parameters accordingly.

Figure 3:
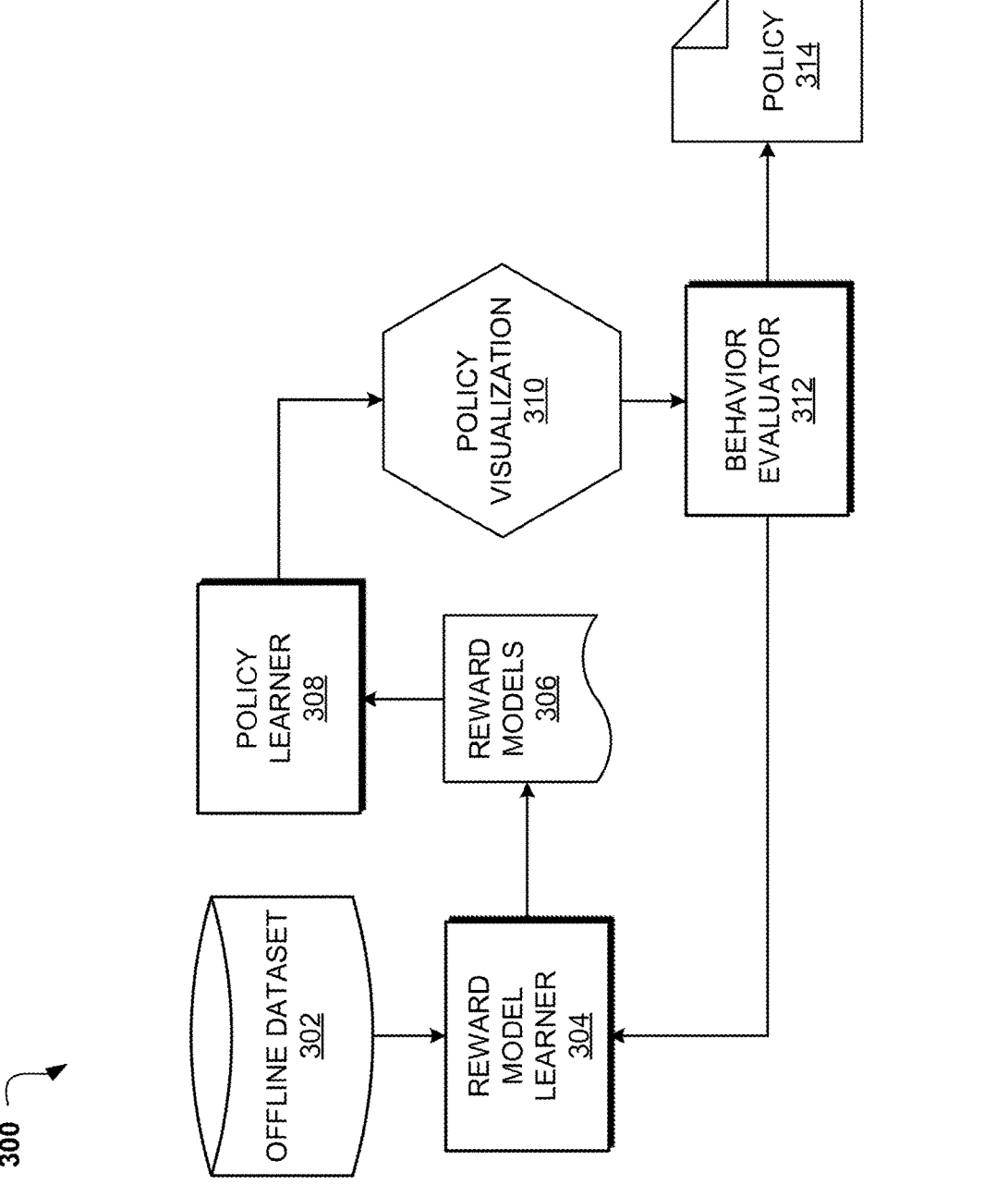
FIG. 3 is a system diagram depicting the components of an offline learner system according to at least one embodiment of the present invention.

Referring now to FIG. 3, a system diagram 300 depicting the components of an offline learner system is depicted according to at least one embodiment. Here, the offline dataset 302 is provided to reward model learner 304 as input. The reward model learner 304 creates reward models 306, which may be a number of reinforcement learning models. The reward models 306 predict the immediate rewards of any given state change or action based on the offline dataset 302 and provide the predicted immediate rewards as output to policy learner 308. Policy learner 308 calculates a value function expressing the expected reward of a sequence of actions based on the predicted immediate rewards provided by reward models 306 and expressed as a robustness operator and creates a policy 314 by calculating a series of actions and state changes that create a maximum expected reward based on the value function. The policy 314 is then provided to the policy visualization 310, which visualizes the policy to the user. The behavior evaluator 312 may, if the user inputs that the policy 314 is not robust based on the visualization from policy visualization 310, pass user-specified hyper-parameters back to the reward model learner 304 to retrain the reward models 306 according to the modified hyper-parameters and re-engage the process to create a new policy 314. The behavior evaluator 312 may, if the user inputs that the policy 314 is robust based on the visualization from policy visualization 310, pass the policy 314 to the agent 108 as output.

It may be appreciated that FIGS. 2-3 provide only illustrations of implementations and do not imply any limitations with regard to how different embodiments may be implemented. Many modifications to the depicted environments may be made based on design and implementation requirements.

Figure 4:
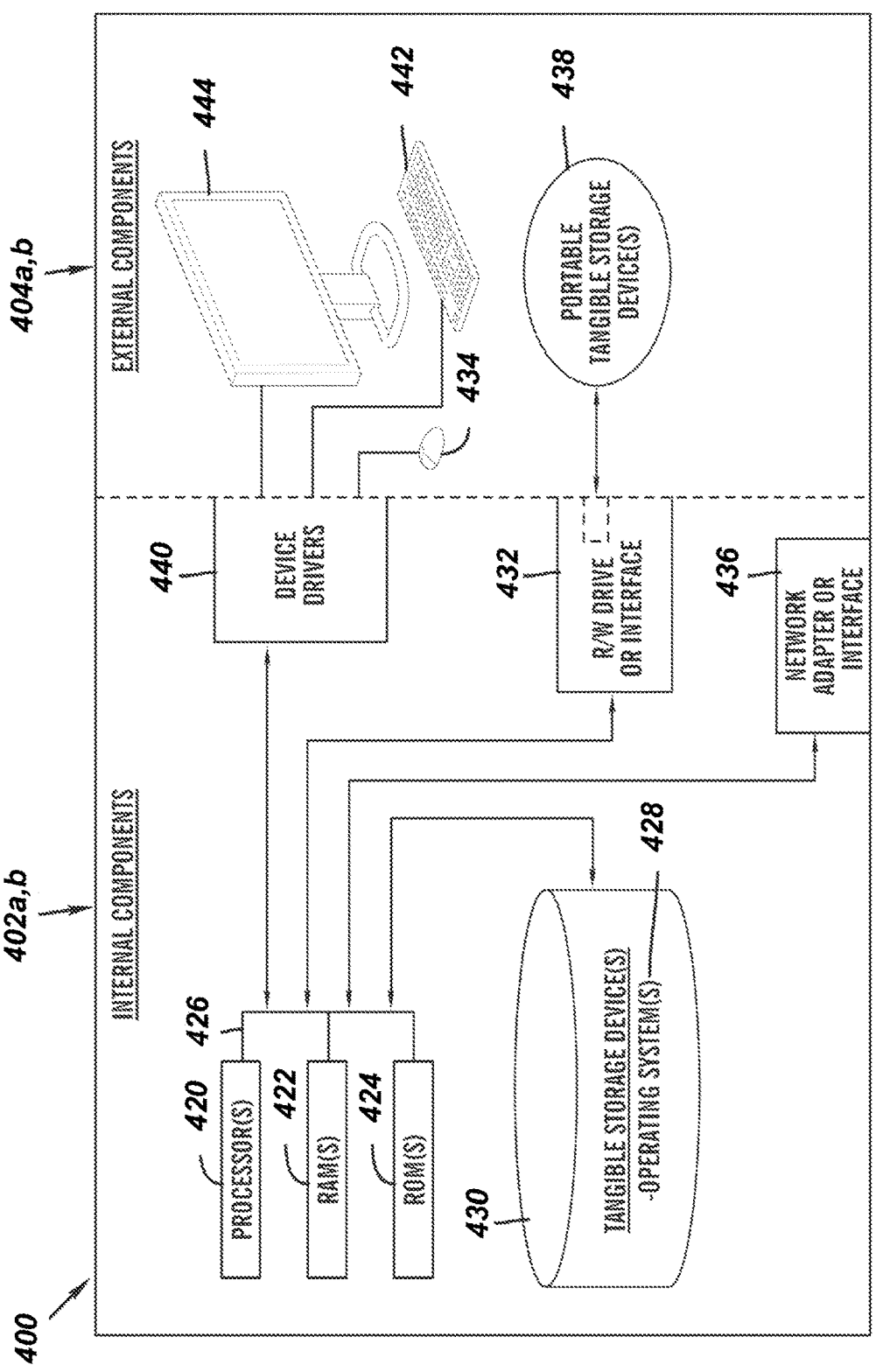
FIG. 4 is a block diagram of internal and external components of computers and servers depicted in FIG. 1 according to at least one embodiment of the present invention.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the agent 108 and the offline learning program 110A in the client computing device 102, and the offline learning program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk, or semiconductor storage device. A software program, such as the offline learning program 110, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The agent 108 and the offline learning program 110A in the client computing device 102 and the offline learning program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the agent 108 and the offline learning program 110A in the client computing device 102 and the offline learning program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
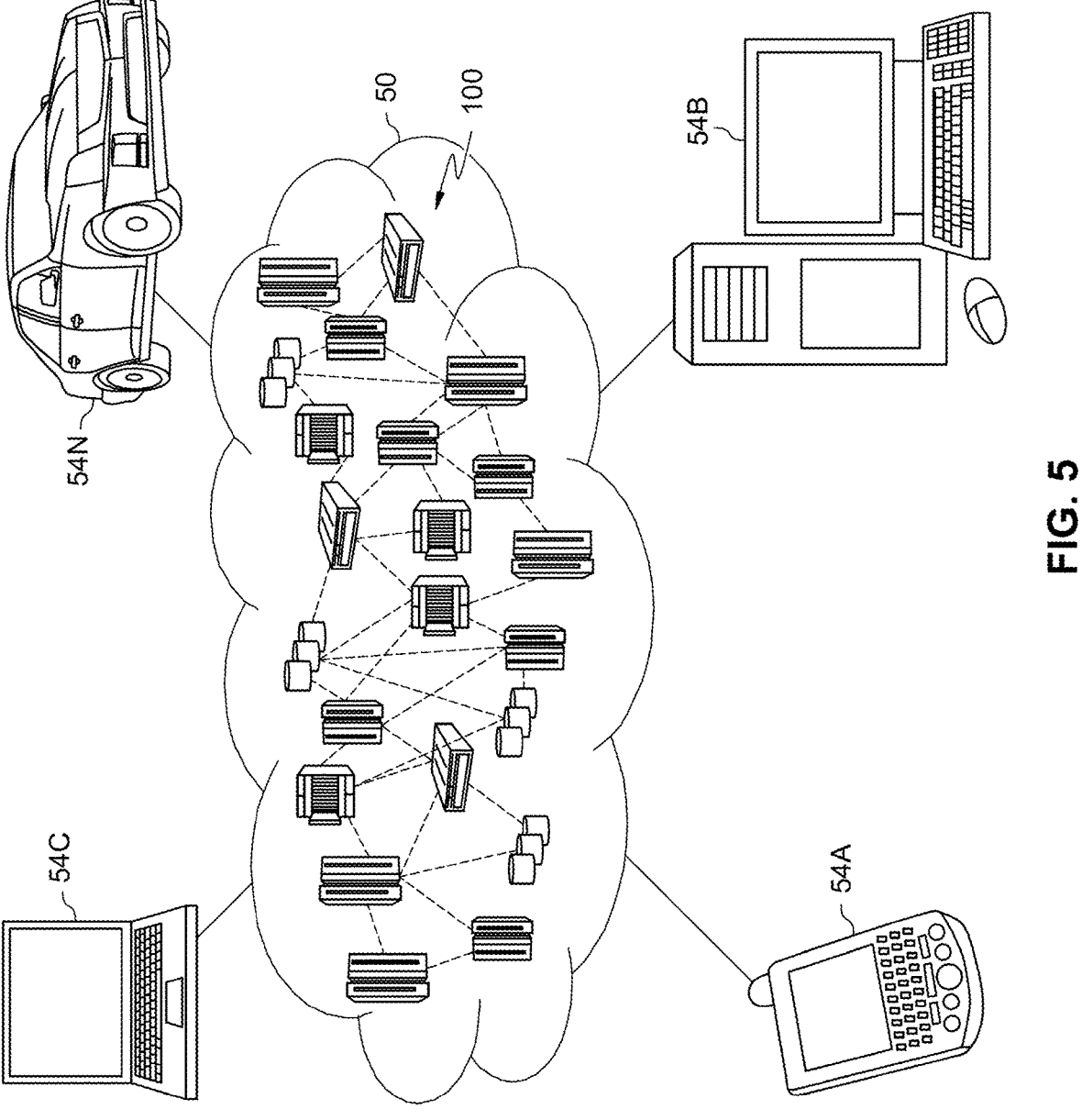
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
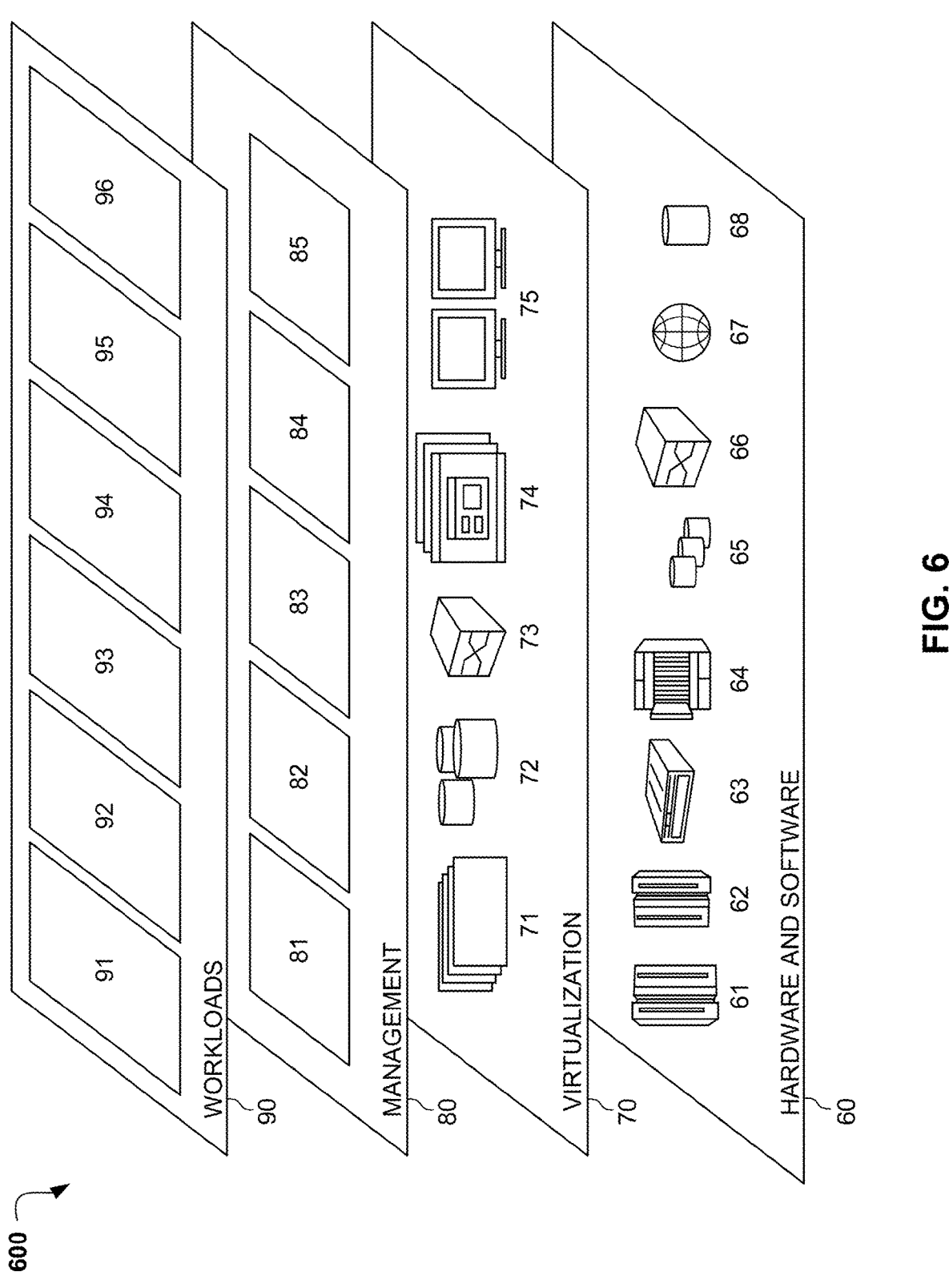
FIG. 6 depicts abstraction model layers according to an embodiment of the present invention.

Referring now to FIG. 6, a set of functional abstraction layers 600 provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and offline learner 96. The offline learning 96 may be enabled to train multiple reinforcement learning models on an offline dataset, and creating a robust policy based on the output of the machine learning models and a robustness operator.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for reinforcement learning, the method comprising:

generating, by a processor, a set of diverse reward models, wherein the diverse reward models comprise a plurality of reinforcement learning models differing from each other in at least one of hyper-parameters and machine learning technique;

training, by the processor, the diverse reward models in parallel to predict expected rewards for performing any of a plurality of state transitions and a plurality of actions using an offline dataset, wherein the offline dataset comprises the actions and the state transitions as performed by an agent and associated rewards;

determining, by the processor using the plurality of diverse reward models, a robustness operator, wherein the robustness operator is a function which takes as its input a vector of the expected rewards predicted by the set of diverse reward models for any of the actions and the state transitions, and expresses the vector as a single number;

computing, by the processor, a value function based on the robustness operator that determines how much reward the agent receives for the state transitions and the actions; and creating, by the processor, a policy by utilizing the value function to determine a sequence of the state transitions and the actions resulting in a maximum total reward, wherein the policy expresses the sequence.

2. The method of claim 1, further comprising:

visualizing a behavior of the policy to a user.

3. The method of claim 1, further comprising:

adjusting one or more of the hyper-parameters associated with the diverse reward models based on user feedback.

4. The method of claim 1, wherein the plurality of diverse reward models are selected from regression models and neural networks.

5. The method of claim 1, wherein the robustness operator comprises a tau-percentile over a k-dimensional vector of reward values.

6. The method of claim 1, wherein the robustness operator comprises a minimum over a k-dimensional vector of reward values.

7. The method of claim 1, wherein the robustness operator comprises a preference relation defined by a convex combination of elements in a k-dimensional reward vector.

8. A computer system for reinforcement learning, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the program instructions, when executed by the one or more processors, cause the computer system to perform a method comprising:

generating a set of diverse reward models, wherein the diverse reward models comprise a plurality of reinforcement learning models differing from each other in at least one of hyper-parameters and machine learning technique;

training the diverse reward models in parallel to predict expected rewards for performing any of a plurality of state transitions and a plurality of actions using an offline dataset, wherein the offline dataset comprises the actions and the state transitions as performed by an agent and associated rewards;

determining, using the plurality of diverse reward models, a robustness operator, wherein the robustness operator is a function which takes as its input a vector of the expected rewards predicted by the set of diverse reward models for any of the actions and the state transitions, and expresses the vector as a single number;

computing a value function based on the robustness operator that determines how much reward the agent receives for the state transitions and the actions; and creating a policy by utilizing the value function to determine a sequence of the state transitions and the actions resulting in a maximum total reward, wherein the policy expresses the sequence.

9. The computer system of claim 8, further comprising: visualizing a behavior of the policy to a user.

10. The computer system of claim 8, further comprising: adjusting one or more of the hyper-parameters associated with the diverse reward models based on user feedback.

11. The computer system of claim 8, wherein the plurality of diverse reward models are selected from regression models and neural networks.

12. The computer system of claim 8, wherein the robustness operator comprises a tau-percentile over a k-dimensional vector of reward values.

13. The computer system of claim 8, wherein the robustness operator comprises a minimum over a k-dimensional vector of reward values.

14. The computer system of claim 8, wherein the robustness operator comprises a preference relation defined by a convex combination of elements in a k-dimensional reward vector.

15. A computer program product for reinforcement learning, the computer program product comprising:

one or more computer-readable tangible storage medium and program instructions stored on at least one of the one or more tangible storage medium, the program instructions executable by a processor to cause the processor to perform a method comprising:

generating a set of diverse reward models, wherein the diverse reward models comprise a plurality of reinforcement learning models differing from each other in at least one of hyper-parameters and machine learning technique;

training the diverse reward models in parallel to predict expected rewards for performing any of a plurality of state transitions and a plurality of actions using an offline dataset, wherein the offline dataset comprises the actions and the state transitions as performed by an agent and associated rewards;

determining, using the plurality of diverse reward models, a robustness operator, wherein the robustness operator is a function which takes as its input a vector of the expected rewards predicted by the set of diverse reward models for any of the actions and the state transitions, and expresses the vector as a single number;

computing a value function based on the robustness operator that determines how much reward the agent receives for the state transitions and the actions; and creating a policy by utilizing the value function to determine a sequence of the state transitions and the actions resulting in a maximum total reward, wherein the policy expresses the sequence.

16. The computer program product of claim 15, further comprising:

visualizing a behavior of the policy to a user.

17. The computer program product of claim 15, further comprising:

adjusting one or more of the hyper-parameters associated with the diverse reward models based on user feedback.

18. The computer program product of claim 15, wherein the plurality of diverse reward models are selected from regression models and neural networks.

19. The computer program product of claim 15, wherein the robustness operator comprises a tau-percentile over a k-dimensional vector of reward values.

20. The computer program product of claim 15, wherein the robustness operator comprises a minimum over a k-dimensional vector of reward values.

* * * * *